United States Patent [19]

Hurst et al.

[11] 4,426,576

[45] Jan. 17, 1984

[54] METHOD AND APPARATUS FOR NOBLE GAS ATOM DETECTION WITH ISOTOPIC SELECTIVITY

[75] Inventors: G. Samuel Hurst, Oak Ridge; Marvin G. Payne, Harriman; Chung-Hsuan Chen, Knoxville; James E. Parks, Oak Ridge, all of Tenn.

[73] Assignee: Atom Sciences, Inc., Oak Ridge, Tenn.

[21] Appl. No.: 300,019

[22] Filed: Sep. 8, 1981

[51] Int. Cl.³ .................... H01J 49/42; B01D 59/44

[52] U.S. Cl. .................... 250/283; 250/286; 250/288

[58] Field of Search .............. 250/281, 282, 283, 284, 250/286, 288, 423 R, 425

[56] References Cited

U.S. PATENT DOCUMENTS 3,987,302 10/1976 Hurst et al. .................... 250/283

4,329,582 5/1982 French et al. .................. 250/281 X

OTHER PUBLICATIONS

McGee et al., "Refrigerated Inlet Arrangement . . . ", *Review of Scientific Instruments*, vol. 37, No. 5, May 1966, pp. 561–566.

Armour et al., "Apparatus for the Study . . . ", *Vacuum*, vol. 22, No. 10, Oct. 1972, pp. 457–462.

Joshi et al., "New Detector . . . ", *Review of Scientific Instruments*, vol. 46, No. 5, May 1975, pp. 559–561.

*Primary Examiner*—Alfred E. Smith

*Assistant Examiner*—Jack I. Berman

*Attorney, Agent, or Firm*—Pitts, Ruderman & Kesterson

[57] ABSTRACT

Apparatus and methods of operation are described for determining, with isotopic selectivity, the number of noble gas atoms in a sample. The analysis is conducted within an evacuated chamber which can be isolated by a valve from a vacuum pumping system capable of producing a pressure of $10^{-8}$ Torr. Provision is made to pass pulses of laser beams through the chamber, these pulses having wavelengths appropriate for the resonance ionization of atoms of the noble gas under analysis. A mass filter within the chamber selects ions of a specific isotope of the noble gas, and means are provided to accelerate these selected ions sufficiently for implantation into a target. Specific types of targets are discussed. An electron measuring device produces a signal relatable to the number of ions implanted into the target and thus to the number of atoms of the selected isotope of the noble gas removed from the gas sample. The measurement can be continued until a substantial fraction, or all, of the atoms in the sample have been counted.

Furthermore, additional embodiments of the apparatus are described for bunching the atoms of a noble gas for more rapid analysis, and for changing the target for repetitive cycling of the gas in the chamber. The number of repetitions of the cyclic steps depend upon the concentration of the isotope of interest, the separative efficiency of the mass filter, etc. The cycles are continued until a desired selectivity is achieved. Also described are components and a method of operation for a pre-enrichment operation for use when an introduction of a total sample would elevate the pressure within the chamber to levels in excess of those for operation of the mass filter, specifically a quadrupole mass filter.

Specific examples of three noble gas isotope analyses are described.

29 Claims, 4 Drawing Figures

(A) (B) (C)

METHOD AND APPARATUS FOR NOBLE GAS ATOM DETECTION WITH ISOTOPIC SELECTIVITY

The invention was made under and in the course of a contract with the U.S. Department of Energy.

DESCRIPTION

1. Technical Field

This invention relates generally to the detection of single atoms and more particularly to a method and apparatus for separating selected noble gas atoms from a mixture of atoms and for counting individual of these selected atoms with isotopic selectivity. The method and apparatus are suitable for use with either stable or radioactive species of atoms.

2. Background Art

Although the concept of the atom is older than physics itself, it has been only within the last century and a half that the role of the atom in the concepts of matter has become an important aspect of the scientific world. Just prior to the 20th Century, methods were being developed for the measurement of atoms contained in various forms of matter. As more details of the scientific world were uncovered, additional methods for the detection of atoms have been needed and have been developed. Each of the methods has provided an increased degree of selectivity of atoms as well as sensitivity. Some radioactive atoms having short half-lives may be counted using their decay. Although the need for a method of counting single stable atoms has been recognized for a long time, the goal was not achieved until recently.

One of these advanced types of detection methods for individual atom measurement is known as resonance ionization spectrosopy, referred to hereinafter as RIS or just resonance ionization. The apparatus and method for RIS are described in U.S. Pat. No. 3,987,302 issued on Oct. 19, 1976 to G. S. Hurst et al. This patent is incorporated herein by reference. Basically, RIS can be defined as a state-selected detection process in which pulsed tunable lasers are used to promote transitions from the selected state of the atoms in question to higher states, one of which will be ionized by the further absorption of another photon. The resultant ions of a selected atom are then detected by suitable means. Since measurements of the number of electrons or ions can be made very precisely, and even one electron or one positive ion can be detected, the technique can be used to make quantitative measurements of a very small population of the state-selected species.

Since the development of the RIS method, it has been used by many research groups for the study of highly specialized atom counting in fundamental and applied research. However, other potential applications for the RIS method of counting atoms cannot be made because of the lack of isotopic selectivity. For example, in the study of the circulation of water in the ocean, the samples of the water contain only a small quantity of the isotope argon-39. Surface water samples may contain, for example, of the order of 6,000 atoms of this isotope, together with $10^{19}$ atoms of argon-40 per liter of ocean water. An accurate measurement of the specific number of $^{39}$Ar atoms provides information on the circulation of this surface water to the lower depths of the ocean. In a similar manner, studies to estimate the age of polar ice require counting approximately 1,000 atoms of the isotope krypton-81 in one liter of ice when there are also present $1.4\times10^{15}$ other krypton atoms. There are other similar problems where a very small quantity of atoms of an element must be detected in the presence of the large quantity of other isotopes of the same element. In both of these examples, it is impractical to determine the number of atoms of the desired isotopes by decay counting because of the long half-lives of the isotopes (270 years for $^{39}$Ar and $2\times10^5$ years for $^{81}$Kr).

Accordingly, it is one object of the present invention to selectively separate one population of noble gas atoms from a large quantity of some other types of noble gas atoms and to quantitatively determine the number of selected atoms.

It is also an object to provide a method and apparatus for selecting a specific group of noble gas atoms and to count individual of these atoms with isotopic selectivity.

It is still another object of the present invention to preform this sorting and counting for either stable or radioactive species of the specific atoms.

Other objects and advantages of the invention will become apparent upon reading the detailed description and by reference to the drawings.

DISCLOSURE OF THE INVENTION

In accordance with the invention, a method and apparatus are provided for separating selected noble gas atoms from a mixture of atoms and for counting individual of these selected atoms with isotopic selectivity in the form of either stable or radioactive species. In an appropriate vacuum system, the selected atomic species is ionized using the selective resonance ionization process. The resultant ions of the selected specie pass through a mass filter thereby giving an isotopic selectivity to the desired atomic species and these selected ions are implanted at moderate voltage into a target. The implantation of these ions give rise to electrons in proportion to the number of ions striking the target. These electrons are detected, by any suitable means to measure the number of atoms implanted in the target. After a period of time to permit a substantial portion of the atoms to be implanted, any remaining gas in the system is removed by vacuum pumping. Thereafter, the implanted material is driven from the target whereupon it is released as a gas back into the evacuated system. This entire process is then repeated a number of times giving rise to an enrichment based upon the number of cycles and the enrichment per cycle. Finally, the isotopic atoms of the selected specie are counted by implantation into a new target and the measurement of the electrons is a measure of the atoms producing these ions. The final target may be retained indefinitely for further counting, if desired or as a permanent record of the particular sample. A more rapid counting of the desired atoms may be accomplished by first concentrating the desired atoms prior to RIS as by condensing them upon a very cold surface. These condensed atoms are suddenly released when the surface is rapidly heated as by irradiation with a separate laser. Thereafter, while the atoms are localized in a region of space near the surface, ions are produced using the resonance ionization process and the other steps are performed, as above. Furthermore, a pre-enrichment of the sample may be performed in the apparatus prior to the actual enrichment and final analysis with RIS.

BEST MODE FOR CARRYING OUT THE INVENTION

Figure 1:
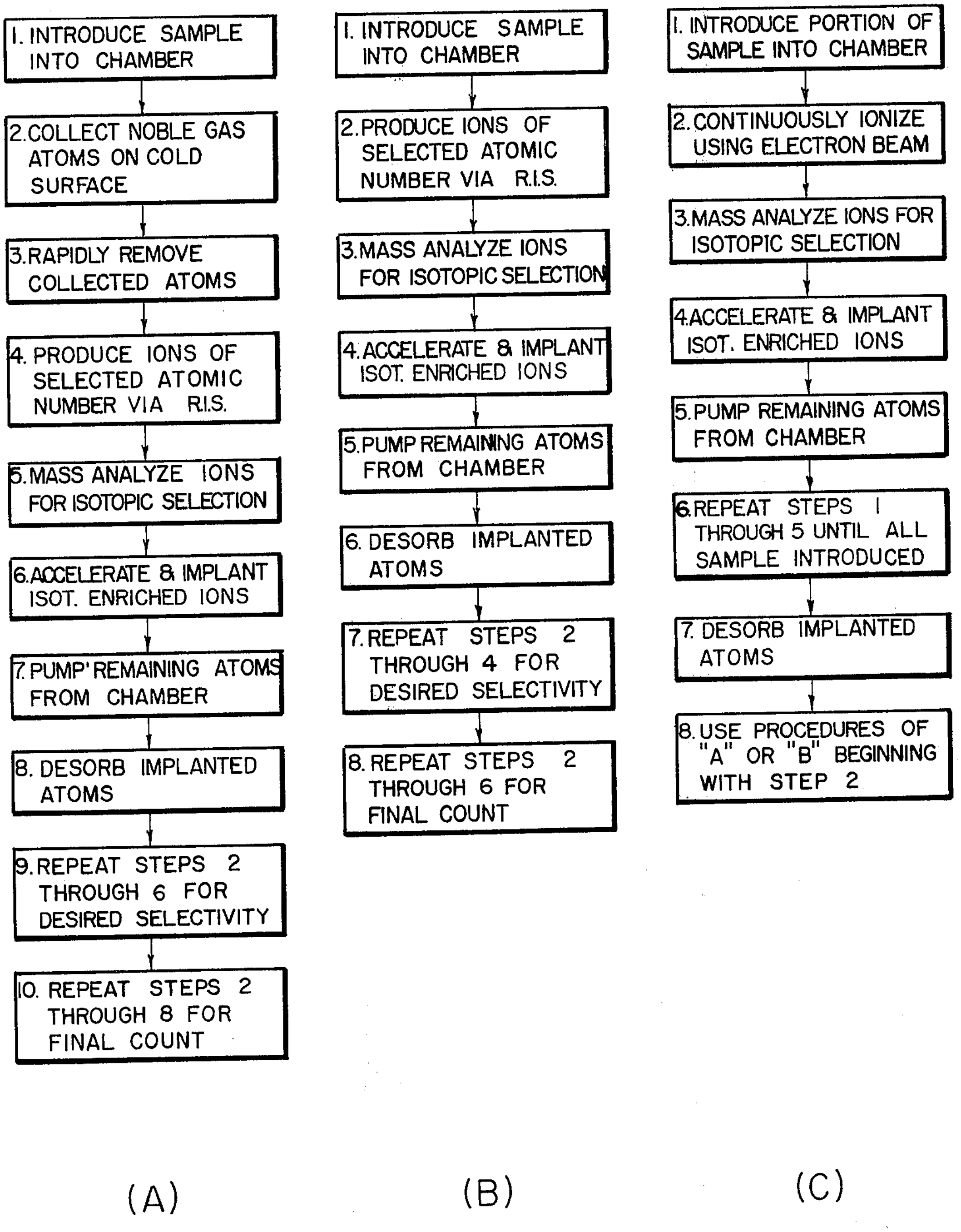
FIG. 1 is an itemization of the steps of three embodiments of the process described below.

Referring first to FIG. 1, shown therein are the essential steps to carry out three embodiments of the present invention. In FIG. 1A, a noble gas sample is introduced into an evacuated chamber and thereafter the material of interest is collected, i.e. concentrated, in a preselected location within the apparatus as upon a surface at low temperature. The material of interest is quickly removed from the collecting surface by suitable means and subjected to the RIS process. The resultant ions include all of the isotopes of the selected species (selected atomic number); therefore, to select a specific isotope, the ions are passed through a mass analyzer to enhance the ions of the desired isotope. These enhanced isotopic ions are then accelerated prior to being implanted into a target. When the ions become implanted, electrons are produced with the number being in proportion to the number of ions striking the target. After a substantial portion of the desired isotope ions have been implanted, as determined by a stabilization of the electron count or from other considerations, the undesired isotopes are pumped from the chamber with an ultrahigh vacuum system. Thereafter, the implanted atoms are desorbed from the target and the steps beginning with collection on the cold surface are repeated a sufficent number of times to achieve a desired selectivity.

In applications of the invention where the bunching or concentrating is not needed, i.e. when the concentration of the isotopic specie under study is greater and the time-saving feature of bunching is less advantage, the embodiment illustrated step wise in FIG. 1B may be utilized. After introduction of the sample, ions of the selected specie are produced using RIS. The remaining steps of this embodiment are substantially the same as in FIG. 1A except that each repeat cycle excludes the concentration step via the buncher.

In some applications of analysis a relatively large sample of material must be utilized for adequate statistics. If such a large sample is introduced into the apparatus, the pressure therein exceeds that required for proper operation of the mass filter. This problem is negated by a pre-enrichment step, an embodiment illustrated step wise in FIG. 1C. For this embodiment, the sample is admitted into the analysis system in a step-like manner whereby the vacuum pressure is maintained at a relatively low valve. During each admittance step, the sample material is ionized as with an electron beam. These ions are subjected to a mass analysis, with subsequent ion implantation into a target as in FIGS. 1A and 1B. After the introduction of the entire sample, followed by vacuum pumping, the implanted material is driven from the target to return to the evacuated chamber. Thereafter ions are produced using RIS and the remaining steps are similar to those shown in FIGS. 1A or 1B.

Figure 2:
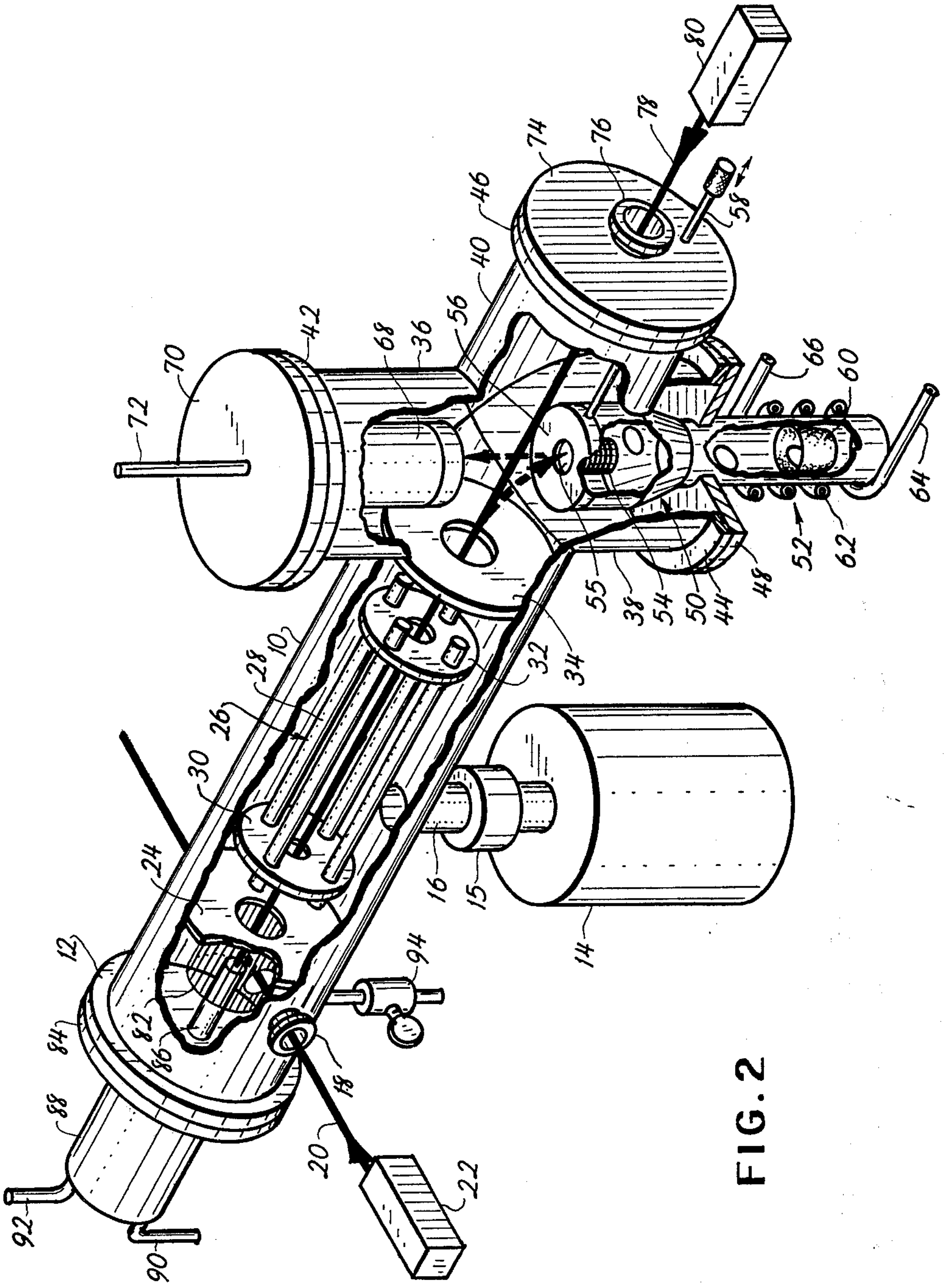
FIG. 2 is a schematic drawing of apparatus for carrying out the embodiments described in FIG. 1.

Referring now to FIG. 2, there is shown therein a schematic drawing of apparatus for carrying out the embodiment of the process for the selection ionization and detection of atoms with isotopic selectivity. A vacuum chamber or housing 10 (typically about 2 liter) is provided at one end with a flange 12. The housing 10 is connected to an appropriate vacuum pumping system 14 by means of vacuum conduit 16. The vacuum conduit contains a valve 15 for purposes described hereinafter. Adjacent the flange 12 in housing 10 are a pair of transverse aligned laser beam ports 18 (only one shown) to accommodate pulse laser beams 20 that originates from a laser source(s) 22. Positioned adjacent the laser beams 20 within the vacuum housing 10 is an apertured entrance plate 24 to a quadrupole mass filter 26 (or the equivalent). This type of filter contains four axially aligned rods 28 held in a pair of suports 30, 32. The mass filter 26 is concluded with an apertured outlet plate 34.

The housing 10, at an end opposite the flange 12, is provided with a T-shaped member having a pair of transverse arms 36, 38 and a third arm 40 aligned with the housing 10. Each of these arms is concluded with a flange 42, 44, 46, respectively. Mounted within the vacuum arm 38 from a flange 48 attached to flange 44 is a target holder 50 and a target vaporizer 52. The target holder includes a vertically stacked supply of disk like targets 54, with the top target designated at 55, and a target changer in the form of an apertured plate 56 and a push rod 58. Targets 54 in the holder 50 are biased upward by any suitable means as with a spring (not shown). The target vaporizer includes a receiving cup 60 and an induction winding 62 supplied through leads 64 and 66. An electron detector 68 is mounted from flange 72 attached to flange 42. This electron detector includes a signal lead 72 connecting to appropriate circuitry (not shown). The arm 40 of the vacuum system is closed by a flange 74 attached to flange 46, and flange 74 includes a laser port 76 centrally positioned therein. This laser port 76 is provided to admit a laser beam 78 derived from an appropriate laser source 80.

Within the vacuum housing 10 adjacent the path of the laser beam 20 is an electron gun 82. It will be readily understood that electrical leads to this gun 82, as well as to the mass filter 26, will be provided by electrical leads into the vacuum housing 10 although these are not shown in the drawing. The vacuum housing 10 is closed at flange 12 with an additional flange 84 to which is attached an axially aligned cold finger 86. The temperature of this cold finger is maintained by a cooling agent, e.g. liquid helium, flowing into a manifold 88 through lines 90, 92. Furthermore, the vacuum housing 10 is provided with a sample inlet valve 94.

In this embodiment, the volume of the chamber 10 is approximately two liters, and the materials of construction are such as to minimize outgassing therefrom. As stated, the preferred mass filter 26 is a quadrupole filter. Such a filter has four rods 28 supplied with dc potentials, superimposed with ac potentials. These potentials are adjustable to provide for the passage of the desired isotope. A particular advantage of this type of filter is the low (appox. 5 volt) acceleration voltage. Thus, unwanted isotope ions have low energy and do not implant in any surfaces: they pick up an electron to become a neutral gas atom. A filter of this type is typically like a Model 12 High Q Head Filter manufactured by Extranuclear Labs, Inc. This commercial filter includes an electron gun 82 as well as the entrance and outlet plates 24, 34. The unit is provided with necessary power supplies and controls.

Copper-berylluim is chosen as the material for the targets 54 due to the favorable release of electrons upon bombardment with ions. It will be recognized that other target materials may be used, and one other material is discussed hereinafter. An electron multiplier, such as a Johnson Laboratories, Inc. Model MM-1, is a satisfactory detector 68. Numerous commercial electronic components are useful for the processing of the signals from the detector, and the selection of these would be known by persons skilled in the art. The signals may be processed to give either digital or analogue information. It will be recognized that the circuits can be time-gated with respect to the firing of the laser source 22, to eliminate extraneous signals occuring at any other time.

The choice of laser sources 22 and 80 will typically be selected by a specific user. However, for the preferred operation for the applications discussed herein, the principal laser within source 22 is a Nd: YAG laser manufactured by Quanta-Ray (Spectrophysics) Inc. The specific wavelengths are produced in a manner such as publically described in Optics Letter, 6, 179 (1981). A suitable laser source 80 is Model FBL-1 manufactured by Candella, Inc.

The above identified three embodiments of the present invention may all be performed in the apparatus illustrated in FIG. 2. In general, these embodiments are described immediately hereinafter: With regard to the embodiment itemized in FIG. 1A, a vacuum is produced within the chamber 10 and its connections 36, 38, 40 by use of an appropriate vacuum system 14. After achieving a pressure of the order of $10^{-8}$ Torr, the valve to the vacuum pumping system is closed. Thereafter, a gaseous sample is admitted to the evacuated chamber 10 through valve 94 whereupon the desired material is condensed upon the cold finger 86. When all of the desired material has been condensed upon this cold finger, a pulsed laser beam 78 derived from the source 80 traverses the vacuum chamber 10 to strike the cold finger 86 causing the atoms condensed thereon to be rapidly vaporized. After an appropriate time delay, to permit the vaporized atoms to travel into the region adjacent the laser port 18, pulsed laser beams having the appropriate wavelengths for performing resonance ionization of the selected specie is initiated from source 22 thereby producing ions predominantly of the selected species within the evacuated chamber 10. The conventional low voltage produced in the mass filter 26 causes these specific ions to pass through the mass analyzer between the rods 28 thereby producing an isotopic separation as the ions traverse the length of the filter. The ions, predominantly those of the selected isotopic specie, are then drawn to the target 55 using an appropriately negative potential as derived from a conventional voltage source (not shown). This voltage causes the ions of the selected isotopic specie to be implanted in the target and at the same time producing electrons which are counted by the apparatus 68. At appropriate intervals when the majority of the isotopic species has been implanted into the target, the valve 15 to the vacuum pumping system is opened to remove substantially all of the residual atoms within the chamber 10 and return the pressure to about $10^{-8}$ Torr. The valve is then closed. Thereafter, the target changer 56 is operated causing the target 55 to be dropped into the vaporization device 52. The application of RF power to the vaporizer 52 through leads 64, 66 causes the target in the cup 60 to be vaporized and the contents thereof are redistributed throughout the vacuum chamber 10. During this process the material of interest is recondensed upon the cold finger 86 and the above-identified steps are repeated. Each repetition of the steps brings about a greater enhancement of the isotope of interest until the background ions are sufficiently low such that the ions implanted upon a target are substantially only those of interest. This target may then be retained for any desired duration particularly if maintained in a storage at very low temperature. The signals derived from the electron counter 68 are then a measure of the number of atoms of the specific isotope of interest in the original sample. One method of detecting the electrons is a digital method, in which the plurality of electrons released by the impact of a single positive ion on the target is counted as one event. The digital method is the preferred method when it is desired to actually count the number of atoms in a sample.

As stated above, there are applications where the concentration of the isotope of interest is such that the time required for a measurement is not objectionably long and the bunching step as accomplished with the cold finger 86 may not be needed. For the analysis of such a noble gas sample, a gaseous sample thereof is introduced through valve 94 into the evacuated chamber 10. Thereafter ions are produced of the atomic specie of interest through the use of an appropriate laser beam 20 tuned for the resonance ionization of that particular species. The resultant ions are then drawn to the mass filter and the same steps as identified above are performed. The steps are repeated without the use of the cold finger until the desired selectivity is achieved, and the final count of the electrons is then a measure of the number of atoms of the desired atomic species in the sample. The final target 55, as before, may be maintained for subsequent counting if desired.

For certain types of analysis, as further identified hereinafter, the concentration of the desired isotopic specie within the sample is very low compared to large quantities of other isotopes. Accordingly, large quantities are required in the sample in order to make meaningful analysis for this particular specie. When this situation occurs, the above-identified apparatus may be used to perform the desired analysis if the following steps as outlined in FIG. 1C are followed. The sample is admitted step-wise through valve 94 into the evacuated chamber 10. This step-wise admission of the sample prevents a serious excursion of the pressure within the chamber which otherwise would not permit the operation of the mass filter. As each portion of the sample is introduced, the material is ionized through the operation of the electron gun 82 thereby producing ions of the material being admitted to the evacuated chamber. The ions so produced are drawn into the mass filter 26 which is adjusted to permit passage of the appropriate mass corresponding to the desired species and to perform isotopic separation of that particular species. The selected isotope is, as above, drawn by a relatively high potential to the target 55 in the holder 50 where these ions are implanted therein giving rise to electrons which are measured by the electron detection mechanism means 68. This is continued until all of the selected isotopes of that portion of the sample which was admitted to the vacuum chamber 10 are implanted. Thereafter, valve 15 is opened until the system 10 has been evacuated by pumps 14; then valve 15 is closed. These steps, beginning with the introduction of a portion of the sample are repeated until all of the sample has been admitted through the valve 94. When all of the sample has been processed in this way and after the vacuum system 10 has been evacuated, the atoms within the target 55 are removed by dropping this target into the cap 60 whereupon the application of RF power to leads 64, 66 causes vaporization of the target. This vaporization reintroduces the specie, enriched in the particular isotope, into the evacuated chamber. The atoms may then be ionized using the laser beams 20 from source 22 with the wavelength thereof selected for appropriate resonance ionization of the specie of interest. If desired, the bunching process as described above on the cold surface 86 may be desirable prior to this ionization of the specie. The ions produced by resonance ionization are again passed through the mass filter 26 whereupon additional isotope enrichment of particular isotopic specie is achieved, with this enriched beam of ions being implanted upon a new target 55. As above, the steps are repeated until a desired selectivity is achieved. The electrons produced in the final bombardment of target 55 are measured and produce information as to the number of atoms of the desired isotopic specie in the original sample.

The embodiments of the subject method and the apparatus shown in FIG. 2 may be further understood by the following examples of the operation of the apparatus for the detection of atoms of specific isotopes in three typical analyses that are possible with this apparatus. One application of the present invention for which it is uniquely suited is the detection of atoms produced by neutrino interactions. Neutrinos are the only particles that are able to escape from the center of the sun where thermonuclear processes occur. Thus, they serve as the only direct means of testing the standard theory of solar fusion processes. One potential scheme for the study of the neutrinos is to permit the interaction of the neutrino with a compound containing the isotope bromine-81. The product of this reaction, is the isotope krypton-81. The experiments for the measurement of the product are difficult due to the fact that typically 10,000 kilograms of matter are needed to generate only one neutrino event per day. Thus, there may be only approximately 500 atoms of krypton-81 in $10^9$ atoms of krypton from atmospheric contaminations in the neutrino targets. The analysis for such small quantity of krypton-81 may be perfomed in the above-identified apparatus as follows. A sample of gas containing a representative sample of material generated by the neutrino interaction is valved into the vacuum chamber 10 through valve 94. The entire amount of krypton is then condensed upon the cold finger 86 maintained at a temperature of about 15° K. due to the liquid helium flowing into the manifold 88 from tube 90. After a sufficient time (about one minute) complete condensation of the krypton occurs on the cold finger 86. Through the operation of the laser source 80 which may be, for example, a flash lamp pumped dye laser having a pulse length of approximately 1 microsecond, the krypton is quickly desorbed from the cold finger 86. At approximately 10 microseconds later, which time permits the krypton to diffuse into the region adjacent the laser port 18, the laser source 22 is operated thereby producing the laser beams 20 using methods known in the art. These laser beams are pulsed and contain the appropriate wavelengths for the ionization of the krypton through the resonance ionization process. Typically, this involves a photon of the wavelength 1251.4 Å plus two photons of 4192 Å. The duration of each laser pulse is approximately 5 nanoseconds. Due to the size and energy of the laser pulse, approximately one krypton ion is produced for every 10 pulses of the laser. The ions that result from this resonance ionization are drawn into the quadrupole mass filter 26 through the existence of the conventional voltage of approximately 5 volts. During the travel of ions through the quadrupole filter an isotopic selection occurs of between $10^3$ and $10^4$ which substantially enriches the isotope of interest. In this particular case, the krypton ions which pass through the mass filter 26 are enriched in the isotope krypton-81 and these are drawn to the target 55 through the application of approximately minus 10 kilovolts potential applied to the target holder 50. The target 55 may be, for example, a metallic composition containing copper and beryllium. The ions striking the target with this acceleration voltage are embedded to a depth of approximately 100 angstroms thereby minimizing normal diffusion from the target at ordinary temperatures. Each ion striking the target 55 gives rise, on an average, to six electrons which are detected in the electron multiplier 68 giving rise to signal through lead 72 to appropriate signal analysis circuitry. The travel time of ions from the region where they are produced to the target is of the order of 30 to 100 microseconds. Whenever it is known that substantially all of the desired isotopes have been implanted, the valve 15 to the vacuum pumping system 14 is opened for a time period to remove undesired atoms and achieve a pressure of about $10^{-8}$ Torr. The target 55 is then removed from the holder 50 and dropped to the target catcher cup 60. Through the application of RF power the copperberyllium target is vaporized and the material contained therein is redistributed into the evacuated chamber 10 whereupon the krypton is recondensed upon the cold finger 86 thus completing one cycle of operation of the apparatus. These same steps are then repeated, if necessary, to achieve the desired selectivity for the krypton-81 isotope. When adequate selectivity has been achieved, the last target having the implanted krytpon-81 is removed and is stored at low temperatures such that it may be counted again in the apparatus at any later date if such counting is necessary or desired. Normally, a total of approximately $10^4$ laser pulses is required to count the krypton-81 atoms. With the laser operating at 10 Hz the desired sensitivity in the measurement of the number of atoms is achieved in approximately $10^3$ seconds or approximately 20 minutes. If the apparatus is operated without the use of the cold finger for the bunching of the atoms of krypton-81, the analysis procedure is approximately 300 times longer or involves a total time of approximately 100 hours.

Figure 3:
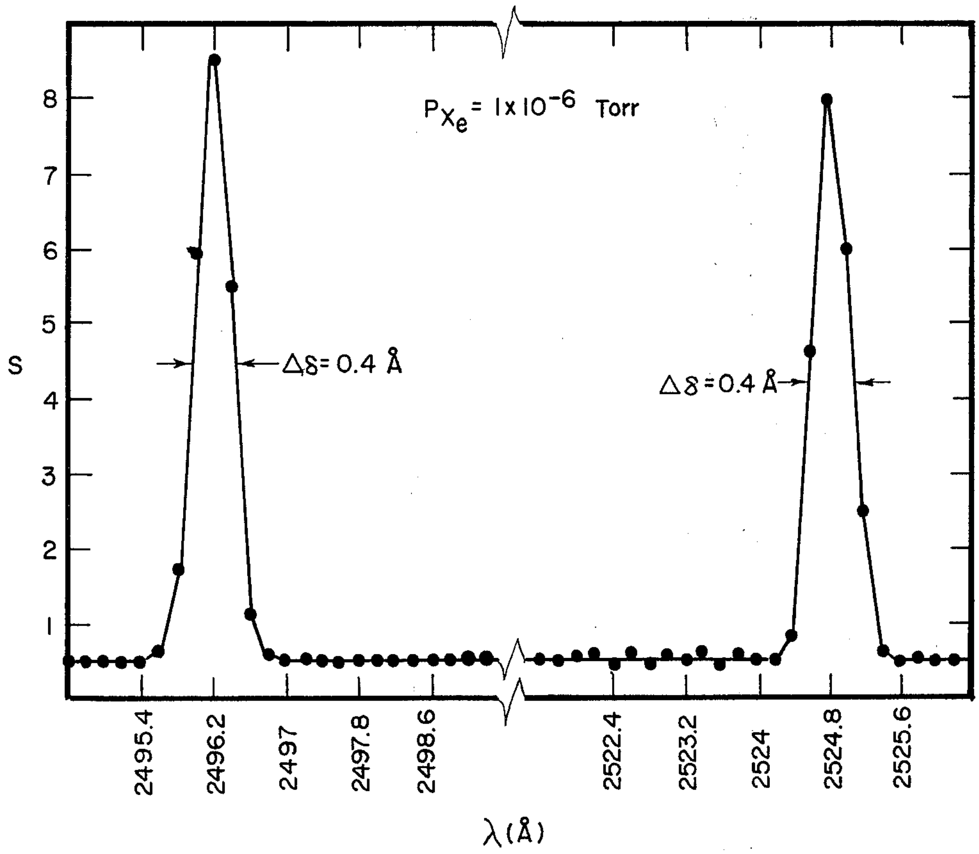
FIG. 3 is a plot of the tuning curve for Xe atoms in which the RIS process involving two photon excitation followed by one photon ionization was used to ionize Xe at the two indicated wavelengths, wherein S is the signal strength at the two wave lengths.
Figure 4:
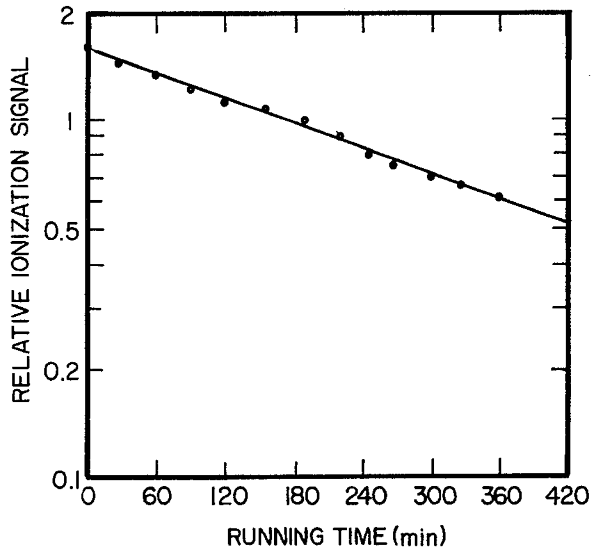
FIG. 4 is a plot of the relative ionization signal versus the laser running time showing the depletion of xenon atoms due to selective ionization of Xe followed by implantation of Xe ions.

Still another application of the present invention is that of measuring the product of the double beta decay of the isotope tellurium-128. This reaction gives rise to xenon-128. A parallel reaction with tellurium-130 gives rise to xenon-130. The analysis of the products is desirable for the study of the fundamental decay schemes of isotopic species. The frequency of the double beta decay of these isotopes produces in a one hundred kilogram sample, after one year, approximately $10^5$ atoms of each of the above-identified xenon isotopes. A sample may be introduced through valve 94 and thereafter ionized using appropriate wavelengths from the laser source 22 to achieve resonance ionization. The frequency used in the resonance ionization process for the isotopes of xenon are shown in FIG. 3. These frequencies can be either 2496.2 Å or 2524.8 Å. The laser ionization volume in the case of xenon can be rather large, e.g. 0.01 $cm^3$; thus, the counting can be performed without the bunching of the atoms on the cold finger 86. The resultant ions are drawn into the quadrupole mass filter 26 through the presence of approximate 5 volts, and these ions drift through the mass filter whereupon an enrichment of approximately $10^3$ of the desired isotopes is achieved. Thus, the ions of xenon-128 are substantially enriched in target 55. Through repeated steps of the release of material from the target and the reionization of the xenon, the analysis of the number of atoms of xenon-128 may be achieved in approximately 20 minutes. It will be recognized that undesired atoms are removed from the chamber 10 by the vacuum pumping system 14 between each cycle of the steps. The demonstration of the storage of the atoms of xenon is illustrated in FIG. 4 which indicates that xenon is stably contained therein.

Still another practical application of the present invention, and the apparatus as shown in FIG. 2, is that of the measurement of the number of atoms of argon-39 which are present with a large quantity of atoms of argon-40. The isotope argon-39 is created by cosmic ray interactions in the atmosphere above ocean water, for example, and is automatically swept into the ocean. The circulation of surface water to lower depths of the ocean may be determined by measuring the quantity of argon-39 in samples taken at various depths. At the surface, a liter of water may contain of the order of $5\times10^3$ atoms of argon-39 and nearly $10^{19}$ atoms of argon-40. The large quantity of these atoms, if introduced into the apparatus of FIG. 2 in its entirety, would raise the pressure to such level that the mass filter could not be operated. In order to accomplish analysis of the number of atoms of argon-39 from such a sample, a pre-enrichment step is necessary in the operation of the apparatus. In this pre-enrichment step, the gaseous sample is introduced through valve 94 in a step-wise manner so that the pressure is always less than $10^{-4}$ Torr. During the admission of each portion of the sample, the electron gun 82 is maintained operating whereby the argon atoms and other atoms present are ionized. The resultant ions are drawn into the mass filter 26 which is adjusted for the transmission therethrough of the isotope argon-39. This achieves an enrichment factor of approximately of $10^3$ over the adjacent isotope argon-40. Other ions present generally do not pass to the mass filter, but reach various surfaces and are neutralized. The ion beam enriched in the isotope argon-39 is accelerated by the aforementioned negative potential applied to target holder 50 whereupon these ions striking the target 55 are implanted therein. Another sample portion may then be admitted. Repumping of the chamber 10 may be necessary after implantation, but before admission of the next portion of the sample. After all of the sample has been admitted to the vacuum chamber 10, and ionized as identified above, the target containing the implanted material is removed from the target holder using the push rod 58 whereupon the target drops into the cup 60. Through the application of RF power to leads 64, 66 the target is vaporized whereupon the argon contained therein is redistributed in the evacuated chamber and is condensed upon the cold finger 86 which bunches all of the argon atoms in a localized position within the system. Thereupon, the laser 80 is operated producing a short laser beam 78 which strikes the cold finger 86 thereby vaporizing the material contained thereon. Approximately 10 microseconds later, the laser system 22 is operated to produce laser pulses of the necessary frequency to achieve resonance ionization of the argon atom. The wavelengths 2496 Å and 7429 Å are introduced into a cell containing Xe, producing radiation near 1070 Å by a four-wave mixing process. This radiation is then combined with a radiation at 4149 Å to excite a 5P level in Argon; this excited state is photoionized by another radiation at 5320 Å. All of these radiations can be generated by anyone skilled in the art by using a Nd: YAG laser to pump three dye lasers. The ions as produced are again subjected to mass analysis in the filter 26 whereupon the ions striking a new target are further enriched in the isotope argon 39. These steps are repeated as discussed above for the krypton atoms until the desired selectivity is achieved. The final counting of electrons produced when ions impinge upon the target 55 is a measure of the number of atoms of argon 39 of the sample. This final target 55 may be maintained for additional counting at a later date.

Components within some types of noble gas samples may give rise to an undesirable level of outgassing within the evacuated chamber 10. For example, $^{40}Ar$ may outgas at a rate of approximately $10^5$ atoms per second. Accordingly, analysis times should be kept as short as possible. This can be accomplished using the buncher and analogue counting. With buncher recurrance time of one second and if many atoms are counted when the ionizing laser beams are fired at 10 Hz, a sample could be analyzed in about ten seconds with 100 laser pulses. This would only give $10^6$ atoms of $^{40}Ar$ due to outgassing and only $10^2$ of these would be transmitted by the mass filter as a background if the abundance sensitivity is $10^4$ for argon.

As discussed above, the entire sample is introduced into the evacuated chamber 10 for the counting of the total atoms of the desired isotope. In some instances the counting of only a portion of the atoms in a sample will provide sufficient information; thus, only a fraction of the time will be required. It will be understood that parameters such as RIS laser energy per pulse, beam quality, etc. must be carefully controlled so that the results can be used to obtain the number of atoms in the entire sample.

The examples given above describe implanting the desired isotope into the target with subsequent reintroduction of the enriched isotope into the evacuated chamber after pumping away undesired isotopes. Alternatively, the mass filter may be adjusted whereby the undesired isotopes are implanted in a target and the desired isotope remains in the gas. This has the advantage that enrichment of the desired isotope increases with time rather than decreases. The targets containing the undesired isotopes are discarded and no melting is necessary. After the wanted selectivity is achieved, the mass filter is adjusted for the desired isotope and this is implanted into a new target, and the resultant electrons provide signals to determine the number of atoms of this isotope.

Another alternative to the invention employs a target of indium for the initial implantations. A resistance heater may be used for melting the indium at about 156° C. at which temperature the indium has a vapor pressure of less than $10^{-15}$ Torr. After melting, the indium would resolidify for a subsequent ion implantation. When a desired selectivity of the isotope under study is achieved, the ions would be implanted in a CuBe target and the electrons counted as above. The two types of targets would be mounted in a holder that can be translated for proper positioning with respect to the ion beam from the mass filter.

The alternative method of pumping out and implanting the unwanted isotopes can be extended to gas phase molecules species such as HI, CO, NO, etc. In the case of molecular species, the molecules are collected on the cold finger and then released by rapid heating via a pulsed laser. After about 10 microseconds, a combination of infrared and visible laser beams ionize a fraction of a selected molecule with unwanted isotopes while only a much smaller fraction of molecules with the desired isotope is ionized. After many repetitions of this procedure nearly all of the selected molecules with the unwanted isotope is removed. The lasers are then turned to other unwanted isotopes and these are selectively removed. Finally, all unwanted isotopes are greatly reduced in number; what remains is nearly all of the molecules with the desired isotope. At some point of sufficient enrichment, the lasers are tuned to selectively ionize the molecules containing the desired specie and the ionization signal is measured as this specie is removed from the system. This variation differs from the procedure for rare gases in that a mass filter is often not necessary, but isotopic selectivity is achieved via the very loarge isotopic shifts in the spectroscopy due to the vibronic and rotational degrees of freedom.

It is of course understood that although preferred embodiments of the present invention have been illustrated and described, various modifications thereof will become apparent to those skilled in the art. Accordingly, the scope of the invention should be defined only the appended claims and the equivalents thereof.

We claim:

1. Apparatus for noble gas atom detection with isotopic selectivity, which comprises:
   - an analysis chamber;
   - means communicating with said analysis chamber for admitting a gas sample containing said noble gas;
   - evacuation means for producing a vacuum within said analysis chamber less than about $10^{-5}$ Torr isolatively connected to said analysis chamber;
   - a pair of laser beam penetrable windows aligned across said analysis chamber;
   - a first pulsatory laser source aligned with said pair of windows, said first laser source capable of producing laser pulses containing wavelengths appropriate for producing ions of said noble gas via resonance ionization;
   - a mass filter within said analysis chamber for receiving noble gas ions produced by said laser pulses at an input and separating ions at an output according to isotopic mass;
   - a solid target within said analysis chamber adjacent said output of said mass filter;
   - means for accelerating said ions between said output of said mass filter and said target to implant said ions within said target;
   - electron detection means within said chamber adjacent said target to determine the number of electrons emitted from said target by said ions created by said laser pulses; and
   - circuit means for measuring said electrons and determining the number of atoms of said noble gas with isotopic selectivity by analyzing pulses of said electrons due to the number of noble gas atoms removed from said gaseous sample by said ion implantation in said target.

2. The apparatus of claim 1 further comprising a cooled surface within said analysis chamber adjacent said pair of windows for condensing atoms of said noble gas; and rapid heating means for substantially completely releasing said condensed atoms from said surface, during a selected time interval with respect to said laser pulses, for ionization by said laser pulses.

3. The apparatus of claim 2 wherein said heating means comprises a second pulsatory laser source and a further laser beam penetrable window in said analysis chamber, said second laser source and said further window aligned with said cooled surface.

4. The apparatus of claim 1 further comprising an electron gun within said analysis chamber adjacent said inlet to said mass filter.

5. The apparatus of claim 1 wherein said mass filter is a quadrupole mass filter.

6. The apparatus of claim 1 wherein said electron detection means is an electron multiplier.

7. The apparatus of claim 1 wherein said target is CuBe.

8. The apparatus of claim 1 wherein said target is indium metal.

9. The apparatus of claim 7 wherein said CuBe is a plurality of discs aligned axially in a holder with a top disc in said holder for receiving said ions for implantation; and further comprises means for melting said top disc and means for axially moving said discs in said holder.

10. The apparatus of claim 9 further comprising transport means for moving said top disc to said heating means.

11. The apparatus of claim 1 wherein said target comprises a disc of CuBe proximate an indium metal foil, and means for moving said CuBe disc and said indium metal foil to a position for individually receiving said ions for implantation.

12. A method for determining the number of atoms of a noble gas with isotopic selectivity, which comprises:
   - introducing a gaseous sample containing said noble gas into an analysis chamber evacuated to a pressure less than about $10^{-5}$ Torr;
   - pulse ionizing said noble gas within said analysis chamber within a selected time interval;
   - mass separating resultant ions of said noble gas in said analysis chamber to achieve ions of a selected isotope of said noble gas;
   - implanting said ions of said selected isotope into a solid target within said analysis chamber;
   - measuring pulses of electrons emitted from said target during implantation; and
   - determining the number of atoms of said selected isotope using said measured electrons by analyzing said pulses of electrons in response to atoms of said noble gas removed from said gaseous sample by said ion implanting step.

13. The method of claim 12 further comprising condensing said noble gas on a cooled surface within said analysis chamber after introducing said sample, and rapidly evaporating substantially all of said condensed noble gas prior to said ionizing step.

14. The method of claim 12 wherein said ionizing step comprises subjecting said noble gas to pulses of first laser beams, the wavelengths of radiation in said first laser beams appropriate for resonance ionization of said noble gas.

15. The method of claim 12 wherein said ionizing step comprises subjecting said noble gas in said analysis chamber with a pulsed electron beam of sufficient energy to ionize said noble gas.

16. The method of claims 14 or 15 wherein said mass separating step comprises passing said ions of said noble gas through a quadrupole mass filter.

17. The method of claim 12 further comprising connecting said analysis chamber to a vacuum pumping system, thereby removing residual gaseous material from said analysis chamber, after said implanting step; isolating said analysis chamber from said vacuum pumping system; melting said target; and repeating said method steps beginning with said ionizing step through said implanting step for a sufficient number of times to achieve a desired isotopic selectivity.

18. The method of claim 12 wherein said implanted ions are of the noble gas isotopic atoms for which the analysis is desired.

19. The method of claim 12 wherein said implanted ions are of noble gas isotopic atoms other than those for which the analysis is desired.

20. The method of claim 12 wherein said measuring step comprises detecting electrons resulting from said implanting step with an electron multiplier.

21. The method of claim 12 wherein said implanting step comprises accelerating said selected ions resulting from said mass separating step into a first CuBe disc.

22. The method of claim 21 further comprising moving said first CuBe disc to a heating means and moving a second CuBe disc to replace said first disc.

23. The method of claim 15 wherein said gaseous sample is a first portion of a total sample for analysis, and further comprises:

connecting said analysis chamber to a vacuum pumping system after said implanting step to remove residual gaseous material from said analysis chamber;

isolating said analysis chamber from said vacuum pumping system when the vacuum in said analysis chamber is less than about $10^{-8}$ Torr;

introducing a further portion of said total sample into said analysis chamber; and repeating said ionizing step, said mass separating step, said implanting step and said pumping step until all of said total sample has been introduced and until all of the desired ions have been implanted and said analysis chamber is evacuated;

melting said target thereby reintroducing gaseous atoms of said selected noble gas into said analysis chamber;

ionizing said reintroduced atoms using pulses of laser beams having appropriate wavelengths for resonance ionization of said noble gas;

mass separating said ions from resonance ionization to achieve ions of a selected isotope of said noble gas;

implanting said ions of said selected isotope into a new target;

measuring electrons produced by said implantation of ions into said new target; and determining the number of atoms of said selected isotope of said noble gas in said total sample from said measurement of said electrons.

24. The method of claim 12 wherein said implanting step comprises accelerating said selected ions resulting from said mass separating step into an indium foil.

25. The method of claim 13 wherein said evaporating step comprises irradiating said cooled surface with pulses of a further laser beam of sufficient energy to evaporate said noble gas from said cooled surface.

26. The apparatus of claim 1 further comprising means for removing said implanted atoms from said target into said chamber.

27. The apparatus of claim 26 wherein said means for removing said implanted atoms from said target comprises means for substantially completely melting said target.

28. The method of claim 12 further comprising removing a significant fraction of said noble gas atoms from said gaseous sample by ionizing and implanting whereby the absolute number of said noble gas atoms in said sample is determined by the number of said ions implanted in said target.

29. The method of claim 14 wherein said laser pulses and said implanting step in said target are continued until a count of said measured electron pulses becomes substantially stable.

* * * * *